(12) United States Patent
Asano

(10) Patent No.: US 7,769,164 B2
(45) Date of Patent: Aug. 3, 2010

(54) PRINTING APPARATUS

(75) Inventor: Yoko Asano, Tokyo (JP)

(73) Assignee: Oki Data Corporation, Tokyo (JP)

(*) Notice: Subject to any disclaimer, the term of this patent is extended or adjusted under 35 U.S.C. 154(b) by 849 days.

(21) Appl. No.: 11/054,121

(22) Filed: Feb. 9, 2005

(65) Prior Publication Data

US 2005/0180564 A1    Aug. 18, 2005

(30) Foreign Application Priority Data

Feb. 13, 2004    (JP) ............................. 2004-036553

(51) Int. Cl.
*H04K 1/00* (2006.01)
*H04L 9/00* (2006.01)
*H04L 9/28* (2006.01)
*H04L 29/06* (2006.01)

(52) U.S. Cl. ............................. 380/28; 380/47; 713/150

(58) Field of Classification Search ................. 380/28, 380/47; 713/150
See application file for complete search history.

(56) References Cited

U.S. PATENT DOCUMENTS

| | | | | |
|---|---|---|---|---|
| 5,239,621 | A * | 8/1993 | Brown et al. | 358/1.16 |
| 5,784,566 | A | 7/1998 | Viavant et al. | |
| 7,283,631 | B2 * | 10/2007 | Torii et al. | 380/59 |
| 2004/0109568 | A1 * | 6/2004 | Slick et al. | 380/277 |
| 2004/0125402 | A1 * | 7/2004 | Kanai et al. | 358/1.15 |
| 2005/0063002 | A1 * | 3/2005 | Sugahara | 358/1.15 |

FOREIGN PATENT DOCUMENTS

| | | |
|---|---|---|
| EP | 1 091 275 A2 | 4/2001 |
| JP | 10-210023 A | 8/1998 |

OTHER PUBLICATIONS

RSA Laboratories' Frequently Asked Questions About Today's Cryptography, Version 4.1 May 2000 Copyright c 1992-2000 RSA Security Inc. All rights reserved. Excerpt pp. 1 & 20-23.*
European Search Report for the corresponding European Patent Application No. 05101026.2; dated Jul. 6, 2006; 6 pages.
T. Dierks et al.; "RFC 2246—The TLS Protocol Version 1.0" [Online] Jan. 31, 1999; pp. 1-5 and 24-47; XP002333277 Retrieved from the Internet: URL: http://www.faqs.org/ftp/rfc/pdf/rfc2246.txt.pdf [ retrieved on Jun. 22, 2005.

* cited by examiner

*Primary Examiner*—Kambiz Zand
*Assistant Examiner*—Benjamin A Kaplan
(74) *Attorney, Agent, or Firm*—Panitch Schwarze Belisario & Nadel LLP

(57) ABSTRACT

When encryption processing means is decided in encryption print communication which is made between a PC and a printer, a transmission/reception control unit of a printer receives information of encryption processing means from the PC and stores into a list storing unit of a RAM. A list of encryption processing means which are used in the printer is read out from a flash memory. An upper apparatus encryption processing means list is compared with the encryption processing means list. If the coincident encryption processing means exists, it is decided that this means is used for communication and the PC is notified of it. Since the PC transmits the print data encrypted by the notified encryption processing means to the control unit, the printing is executed on the basis of the decrypted print data.

20 Claims, 14 Drawing Sheets

FIG.4

| ID NO. 311 | ENCRYPTION KIND 312 | SYSTEM NAME 313 | KEY SIZE 314 |
|---|---|---|---|
| 1 | SYMMETRICAL KEY ENCRYPTION | B | 128bit |
| 2 | SYMMETRICAL KEY ENCRYPTION | A | 128bit |
| 3 | ASYMMETRICAL KEY ENCRYPTION | C | 128bit |

FIG.8B FIRST EMBODIMENT

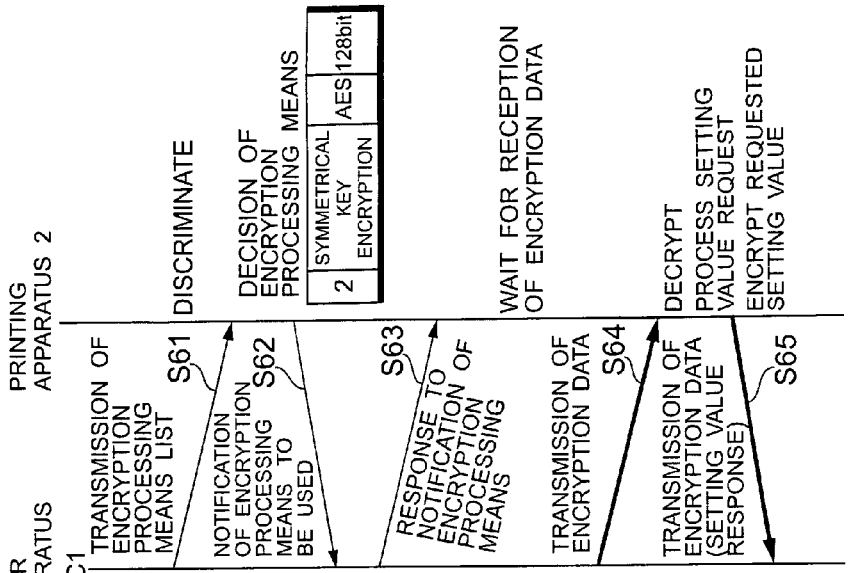
FIG. 9A PRIOR ART
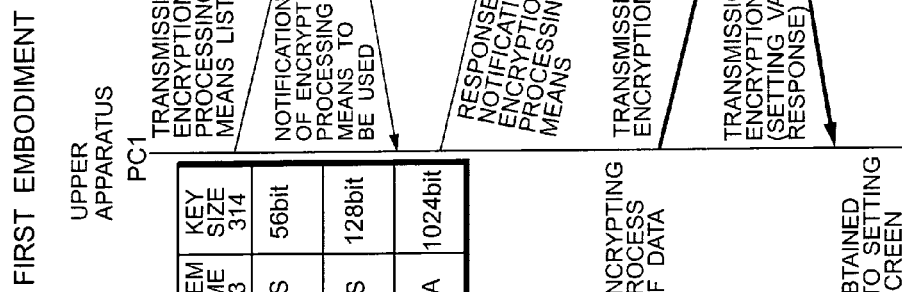
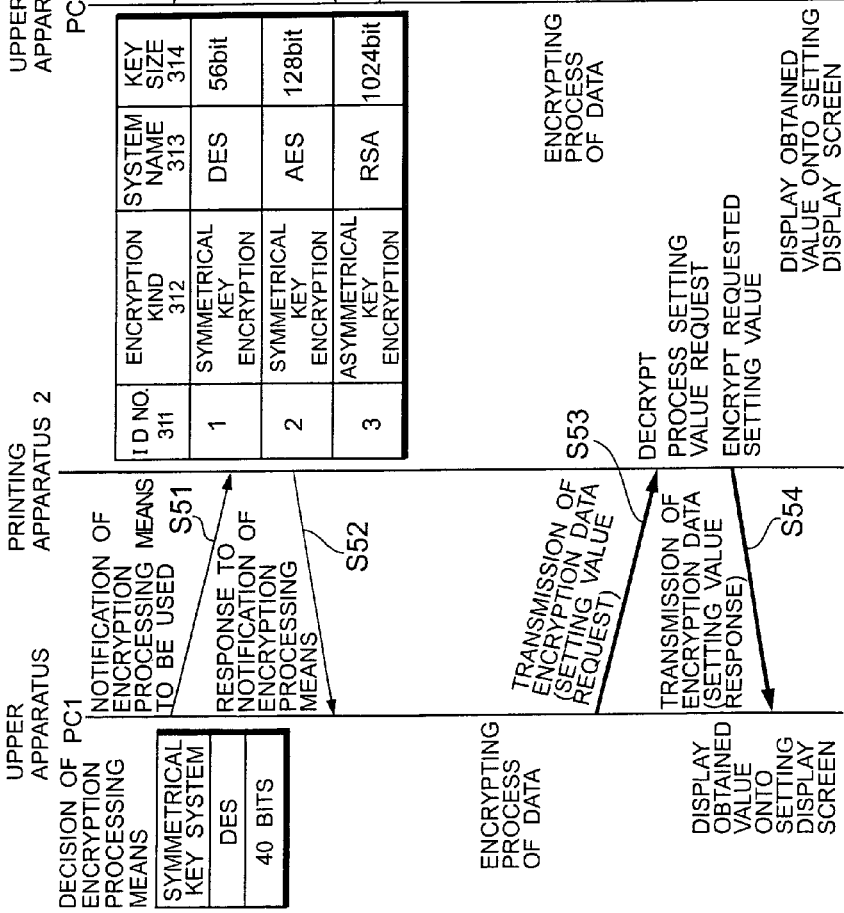
FIG. 9B FIRST EMBODIMENT

FIG.10

| ID NO. 311 | ENCRYPTION KIND 312 | SYSTEM NAME 313 | KEY SIZE 314 |
|---|---|---|---|
| 1 | SYMMETRICAL KEY ENCRYPTION | A | 128bit |
| 2 | SYMMETRICAL KEY ENCRYPTION | B | 128bit |
| 3 | ASYMMETRICAL KEY ENCRYPTION | C | 128bit |

FIG.11

| ID NO. 311 | ENCRYPTION KIND 312 | SYSTEM NAME 313 | KEY SIZE 314 |
|---|---|---|---|
| 1 | ASYMMETRICAL KEY ENCRYPTION | C | 128bit |
| 2 | SYMMETRICAL KEY ENCRYPTION | A | 128bit |
| 3 | SYMMETRICAL KEY ENCRYPTION | B | 128bit |

FIG.13

| ID NO.<br>361 | USER NAME<br>362 | PASSWORD<br>363 |
|---|---|---|
| 1 | otohime | tamatebako |
| 2 | momotaro | kibidango |

FIG.14

REGISTRATION INFORMATION INPUT FIELD

| No | Name | password |
|---|---|---|
| 2 | momotaro | ******* |

REGISTER

DELETE

REGISTRATION INFORMATION LIST

| No | Name | password |
|---|---|---|
| 1 | otohime | ******* |

CLOSE

PRINTING APPARATUS

BACKGROUND OF THE INVENTION

1. Field of the Invention

The invention relates to a printing apparatus for transmitting and receiving data to/from an upper apparatus and, more particularly, to a printing apparatus for encrypting data which is transmitted and received to/from the upper apparatus and communicating.

2. Related Background Arts

Hitherto, as a data encryption system for encrypting data and transmitting and receiving the data between a terminal of an upper apparatus and a printing apparatus, a technique in which a client apparatus as an upper apparatus decides an encryption system which is used and makes encryption communication has been known (for example, refer to JP-A-10-210023 (refer to paragraph Nos. 0114 to 0160 and FIGS. 1 and 2)). According to such a technique, a network print system for executing encryption printing between the client apparatus and the printing apparatus is constructed, when the client apparatus selects whether or not print data is encrypted and transmitted and selects the mode for encrypting the data and transmitting it, the client apparatus selects a kind of encryption, encrypts the print data, and transmits it to the printing apparatus. The client apparatus has discriminating means which discriminates whether or not the encryption is necessary when the print data is transmitted on the basis of a connecting state between the client apparatus and the printing apparatus for executing the printing. The client apparatus transmits the encrypted print data to the printing apparatus on the basis of a discrimination result of the discriminating means. At this time, the discriminating means of the client apparatus discriminates whether or not the client apparatus and the printing apparatus have been connected through the Internet. If they are connected through the Internet, it is determined that the encryption is necessary.

If a communication protocol is a TCP/IP (Transmission Control Protocol/Internet protocol) and is also an Internet printing protocol, the discriminating means of the client apparatus determines that the printing apparatus has been connected through the Internet, and the data is encrypted. At this time, the discriminating means of the client apparatus discriminates whether or not the client apparatus and the printing apparatus exist in a same subnet. If it is determined that they exist in the same subnet, the data is not encrypted. The network print system can add or delete a kind of encryption which can be selected in the client apparatus. The kind of encryption can be changed in the client apparatus on a predetermined data unit basis. Further, by selecting a plurality of kinds of encryption, combining them, and designating order, the network print system can change the kinds of encryption in accordance with the combination order.

However, in the above conventional client apparatus or network print system, although the setting of the encryption and decryption can be made in detail from the client apparatus every communication, it is fairly difficult for the user having poor knowledge regarding the encryption kind to perform the selection of the encryption kind, the detailed setting of the encryption and decryption, and the like which are matched with the intensity of the encryption which the user wants to use. Although the above conventional client apparatus or network print system can also automatically set the encrypting and decrypting processes, in this case, there is such a discrimination reference that in the case where the client apparatus or the network print system has been connected through the Internet or in the case of the IPP (Internet Printing Protocol) printing for controlling the printer through the Internet, the encryption is performed, and if they exist in the same subnet, the encryption is not performed. However, in the conventional client apparatus or network print system, in the case where the user does not want to make the encryption even in the Internet connection or the IPP printing or he wants to make the encryption even if they exist in the same subnet, the automatic discrimination about the execution of the encryption cannot be arbitrarily made or the like, so that use efficiency is low.

SUMMARY OF THE INVENTION

The invention is made in consideration of the foregoing problems and it is an object of the invention to provide a printing apparatus which can easily and arbitrarily perform the selection of the encryption kind, the detailed setting of the encryption and decryption, and the like which are matched with the intensity of the encryption which the user wants to use.

According to the present invention, there is provided a printing apparatus which has a plurality of encryption processing sections, receives encryption data transmitted from an upper apparatus, and executes a desired printing process, comprising:

an encryption information storing section which stores information of a plurality of encryption processing sections which can be used in the printing apparatus; and deciding section which compares information of a plurality of encryption processing sections, that are presented from the upper apparatus and can be used in the upper apparatus, with the information of the plurality of encryption processing section, that are stored in the encryption information storing section, and selectively decides one of the plurality of encryption processing sections, which will be used in the printing apparatus.

Moreover, in the printing apparatus, the deciding section has a speed precedence selection portion which selectively decides the one encryption processing section which will be used in the printing apparatus in rapid order of processing speed.

Moreover, in the printing apparatus, the plurality of encryption processing sections are made up of symmetrical key encryption processing section and an asymmetrical key encryption processing section; the information are made up of a encryption identification symbol which corresponds to the symmetrical key encryption processing section and a encryption identification symbol which corresponds to the asymmetrical key encryption processing section; and the speed precedence selection portion refers to the encryption identification symbols to select the symmetrical key encryption processing section as encryption processing section which is preferentially used.

Moreover, in the printing, the deciding section has a strength precedence selection portion which selectively decides the one encryption processing section which will be used in the printing apparatus in high order of encryption strength.

Moreover, in the printing apparatus, the plurality of encryption processing sections are made up of symmetrical key encryption processing section and an asymmetrical key encryption processing section; the information are made up of a encryption identification symbol which corresponds to the symmetrical key encryption processing section and a encryption identification symbol which corresponds to the asymmetrical key encryption processing section; and the strength precedence selection portion refers to the encryption identification symbols to select the asymmetrical key encryption processing section as encryption processing section which is preferentially used.

Moreover, the printing apparatus may further comprise a sending section which sends selection information of the one encryption processing section decided by the deciding section to the upper apparatus.

Moreover, the printing apparatus may further comprise an error notifying section which performs an error notification to the upper apparatus, when the information of a plurality of encryption processing sections, that are presented from the upper apparatus and can be used in the upper apparatus, do not correspond to the information of the plurality of encryption processing section, that are stored in the encryption information storing section.

Further, according to the present invention, there is also provided a printing apparatus which has a plurality of encryption processing sections, receives encryption data transmitted from an upper apparatus, and executes a desired printing process, comprising:

an encryption information storing section which stores information of a plurality of encryption processing sections which can be used in the printing apparatus; and an identification information registration processing section which executes a registering process of user identification information for identifying a user who uses the printing apparatus; and a deciding section which compares information of a plurality of encryption processing section, presented from the upper apparatus with the information of the plurality of encryption processing section, stored in the printing apparatus encryption information storing section, compares user identification information presented from the upper apparatus with the user identification information registered in the identification information registration processing section, and selectively decides one of the plurality of the encryption processing sections, which will be used in the printing apparatus.

Moreover, in the printing apparatus, the deciding section has an encryption limiting portion which makes encryption strength that can be used by user stored in the identification information registration processing section become higher than that used by user un-stored in the identification information registration processing section.

Moreover, the printing apparatus may further comprise a sending section which sends selection information of the one encryption processing section decided by the deciding section to the upper apparatus.

Moreover, the printing apparatus may further comprise an error notifying section which performs an error notification to the upper apparatus, when there is not a corresponding encryption processing section, by comparing the information of a plurality of encryption processing section, presented from the upper apparatus with the information of the plurality of encryption processing section, stored in the printing apparatus encryption information storing section, and by comparing user identification information presented from the upper apparatus with the user identification information registered in the identification information registration processing section.

According to the printing apparatus of the invention, the encryption processing means which is used is determined on the basis of the information presented from the upper apparatus and the information stored in the self apparatus. Therefore, even if the user does not make the detailed setting for printing from the upper apparatus (that is, PC), the optimum encryption processing means is automatically selected, the encryption communication is made between the upper apparatus and the printing apparatus, and the printing apparatus is enabled to execute desired printing. When the encryption processing means which is used is determined on the basis of the presented information and the information stored in the self apparatus, the printing apparatus to which the information has been presented from the upper apparatus preferentially selects the encryption processing means of a high processing speed, so that a response speed upon print processing can be improved.

According to the invention, when the printing apparatus determines the encryption processing means which is used on the basis of the information presented from the upper apparatus and the information stored in the self apparatus, the encryption processing means of the high encryption intensity is preferentially selected, so that the encryption processing means of the high safety can be efficiently selected. Further, according to the printing apparatus of the invention, by taking the user identification information presented by the upper apparatus into consideration, the printing apparatus can determine the encryption processing means according to the desire of the user. That is, if the user is a significant administrator, the printing apparatus selects the encryption processing means of the high encryption intensity and, if the user is a general user, the printing apparatus selects the standard encryption processing means. Consequently, the encrypting process according to the significance of the information can be selected without being aware of it by the user.

The above and other objects and features of the present invention will become apparent from the following detailed description and the appended claims with reference to the accompanying drawings.

BRIEF DESCRIPTION OF THE DRAWINGS

FIG. 4 is a diagram showing a list of encryption processing means 31a shown in FIG. 3;

FIGS. 8A and 8B show a print processing sequence which is executed between a PC 1 and the printing apparatus 2, in which FIG. 8A shows the prior art and FIG. 8B shows the first embodiment;

FIGS. 9A and 9B show a setting communicating sequence which is executed between the PC 1 and the printing apparatus 2, in which FIG. 9A shows the prior art and FIG. 9B shows the first embodiment;

FIG. 10 is a list table of the encryption processing means which is applied to the second embodiment of the invention;

FIG. 11 is a list table of the encryption processing means which is applied to the third embodiment of the invention;

FIG. 13 is a diagram showing an example of user identification information which is applied to the fourth embodiment of the invention;

FIG. 14 is a diagram showing an example of a registration display screen of the user identification information which is applied to the fourth embodiment of the invention;

DETAILED DESCRIPTION OF THE PREFERRED EMBODIMENTS

Figure 1:
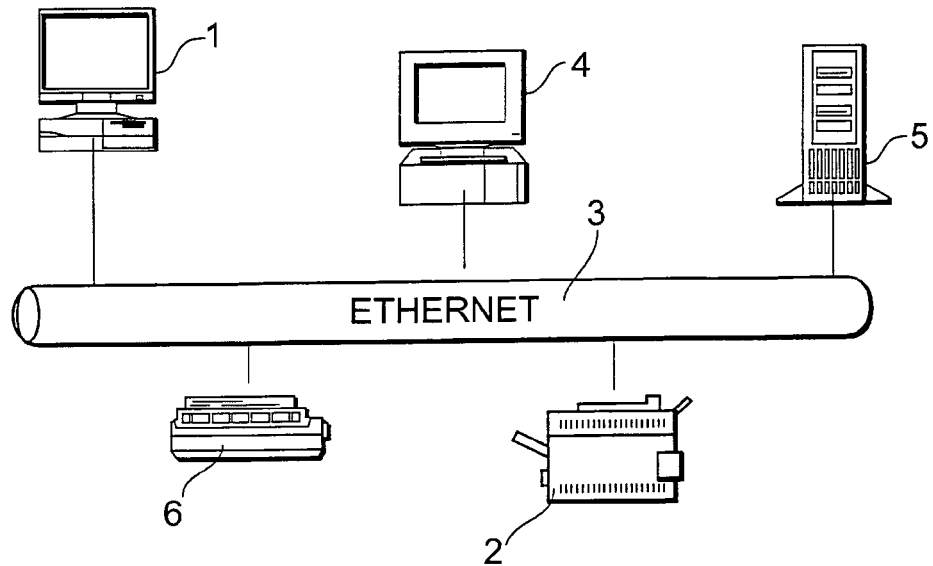
FIG. 1 is a constructional diagram of a network print system which is applied to the invention.

Embodiments of a printing apparatus according to the invention will be described in detail hereinbelow with reference to the drawings. In the following description, the printing apparatus of the invention will be described in comparison with the prior art as necessary for easy understanding. In the diagrams which are used in the description of the embodiments, the same or similar component elements are designated by the same reference numerals and their overlapped explanation is omitted.

First Embodiment

Explanation will be made hereinbelow with respect to an example in the case where the printing apparatus determines encryption processing means which is used for communication and an upper apparatus (client apparatus) is a personal computer (hereinafter, abbreviated to a "PC") in which a printer driver adapted to the printing apparatus has been installed. It is presumed that in the case where the upper apparatus (that is, PC) makes the setting of the printing apparatus, browser software which can be encryption-communicated has been installed in the printing apparatus. The encryption processing means is means which encrypts data or means which decrypts the encrypted data and returns it to the original data. It is presumed that the prerequisite conditions as mentioned above are applied to all embodiments, which will be explained hereinbelow.

<Construction>

First, a construction of a network print system and the printing apparatus which are applied to the invention will be explained. FIG. 1 is a constructional diagram of the network print system which is applied to the invention. As shown in FIG. 1, a PC 1 and a printing apparatus 2 are connected through a network such as Ethernet 3 or the like. Although a computer 4 in which an OS different from that of the PC 1 has been installed, a server 5, a printer 6, and the like are connected to the Ethernet 3, since they are not directly concerned with the invention, attention is paid only to the PC 1 and the printing apparatus 2 in the following explanation.

Figure 2:
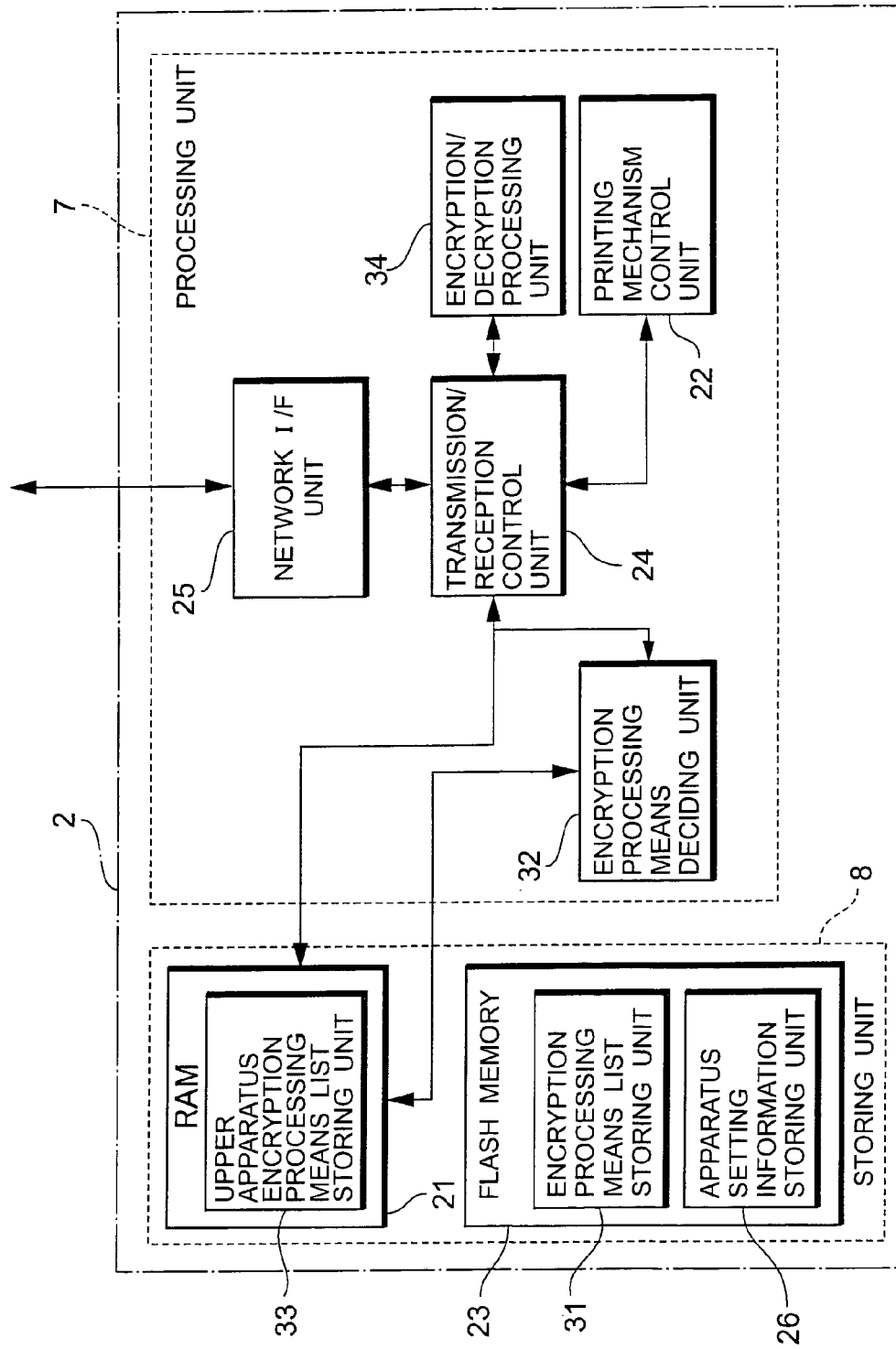
FIG. 2 is a constructional diagram of a printing apparatus which is applied to the first embodiment of the invention.

FIG. 2 is a constructional diagram of the printing apparatus which is applied to the first embodiment of the invention. As shown in FIG. 2, the printing apparatus 2 has a processing unit 7 and a storing unit 8. The processing unit 7 comprises: a printing mechanism control unit 22 for developing data into printable bit map data; a transmission/reception control unit 24 for controlling transmission and reception of the data to/from the PC 1; a network interface (I/F) unit 25 to control a protocol for transmitting and receiving the data to/from the outside; an encryption processing means deciding unit (deciding means) 32 which decides the encryption processing means to be used; and an encryption/decryption processing unit 34 which executes an encrypting process of the data and a decrypting process of the encrypted data. The storing unit 8 comprises: a RAM 21 as a readable/writable temporary storing area in which information is erased when a power source is turned on/off; and a flash memory 23 in which information is not erased even if the power source is turned on/off. Further, the RAM 21 has an upper apparatus encryption processing means list storing unit 33 which temporarily stores a list of encrypting means presented from the upper apparatus. The flash memory 23 comprises: an apparatus setting information storing unit 26 which stores setting information of the printing apparatus 2; and an encryption processing means list storing unit (printing apparatus encryption information storing unit) 31 which stores a list of encryption processing means that can be used (information of a plurality of encryption processing means).

Figure 3:
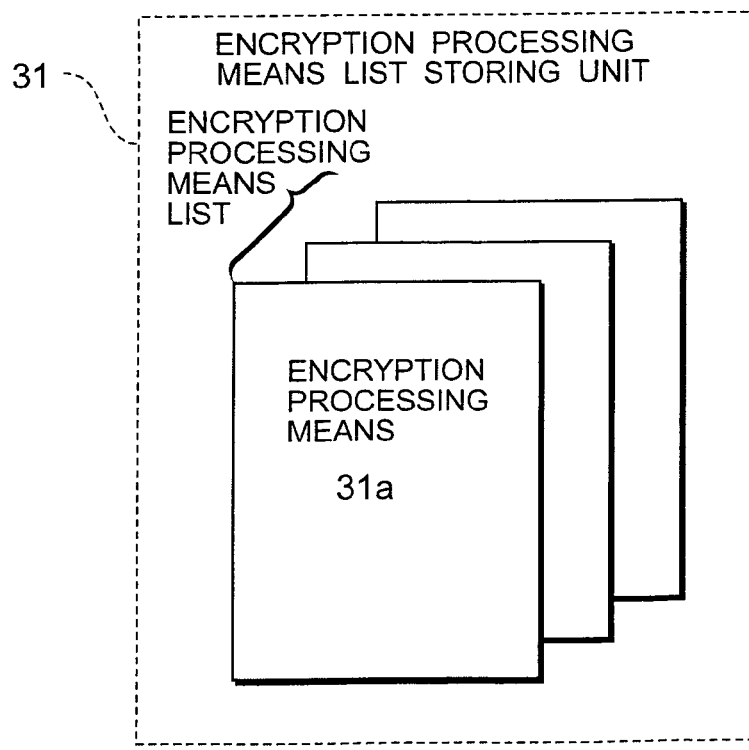
FIG. 3 is a constructional diagram of an encryption processing means list storing unit 31 in a printing apparatus 2 in FIG. 2.

FIG. 3 is a constructional diagram of the encryption processing means list storing unit 31 in the printing apparatus 2 in FIG. 2. As shown in FIG. 3, the encryption processing means list storing unit 31 has encryption processing means 31a which can be used as an encryption processing means list. FIG. 4 is a diagram showing the list of the encryption processing means 31a shown in FIG. 3. As shown in FIG. 4, the following information has been recorded on the list of the encryption processing means 31a in the encryption processing means list storing unit 31 in the printing apparatus 2: an identification number (ID No.) 311 such as 1, 2, 3, or the like; an encryption kind 312 such as symmetrical key encryption, asymmetrical key encryption, or the like; a system name 313 such as A, B, C, or the like; and a key size 314 such as 128 bits or the like. It is presumed that upon printing, the list of the encryption processing means 31a as shown in FIG. 4 is also transferred to the upper apparatus encryption processing means list storing unit 33 in FIG. 2 shown by the upper apparatus (PC 1). Further, it is presumed that in the setting operation, an encryption processing means list which is used in an SSL/TLS (Secure Sockets Layer/Transport Layer Security) system as a communicating procedure for encrypting communication contents is transferred to the upper apparatus encryption processing means list in the upper apparatus encryption processing means list storing unit 33 shown as an upper apparatus (PC 1).

<Operation>

Figure 5:
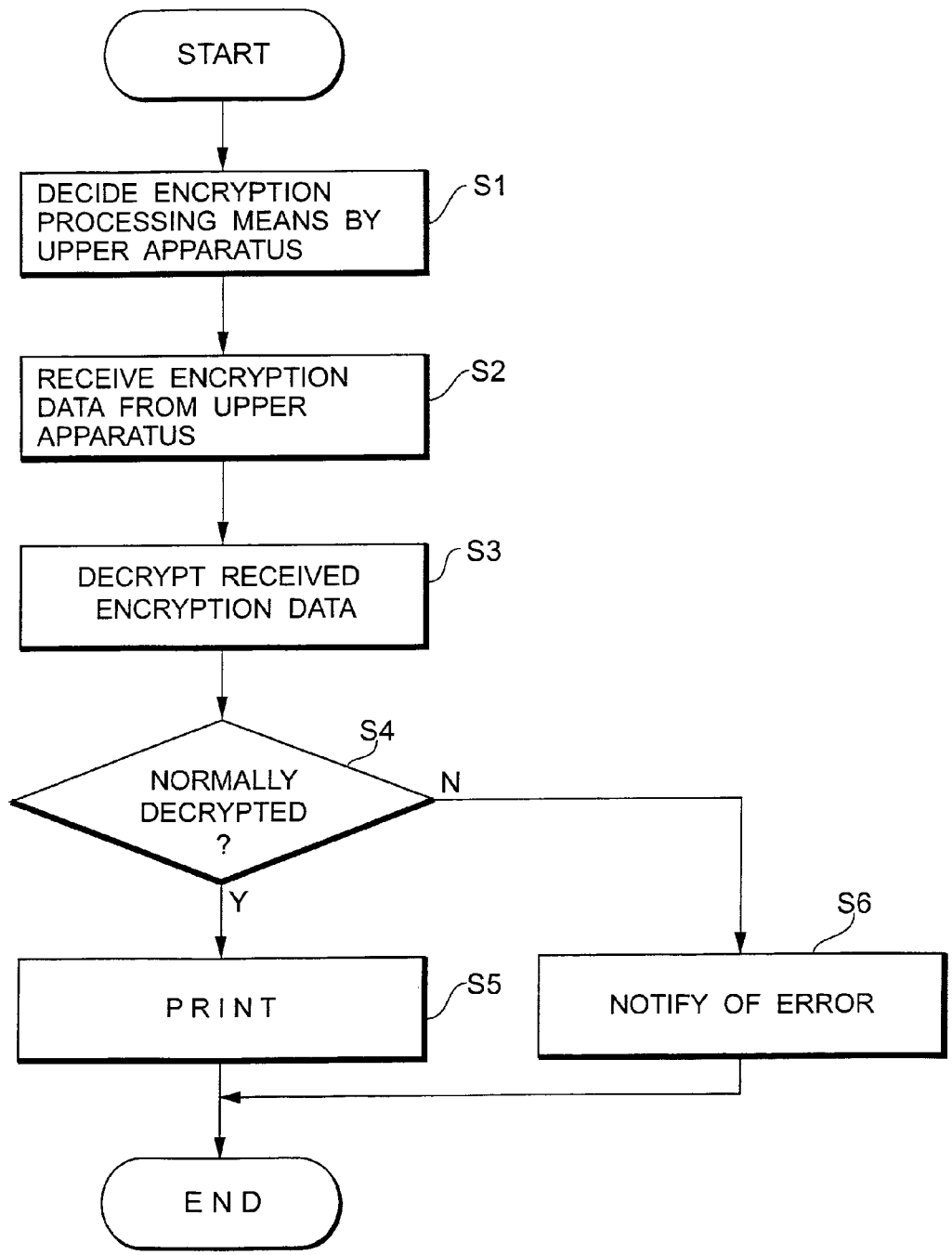
FIG. 5 is a flowchart showing a flow for general encryption print communication.

A flow for the operation of the encryption processing means deciding unit 32 in the printing apparatus 2 shown in FIG. 2 will now be described. First, a flow for each of the general encryption print communication and encryption setting communication which are made between the PC 1 and the printing apparatus 2 will be explained. FIG. 5 is a flowchart showing the flow for the general encryption print communication. In FIG. 5, when the upper apparatus (PC 1) decides the desired encryption processing means (step S1), the printing apparatus 2 receives the decided encryption data from the PC 1 (step S2) and decrypts the received encryption data (step S3). The printing apparatus 2 discriminates whether or not the received encryption data has normally been decrypted (step S4). If it was normally decrypted (YES in step S4), desired printing is executed (step S5). If it is not normally decrypted (NO in step S4), the PC 1 is notified of an error (step S6).

Figure 6:
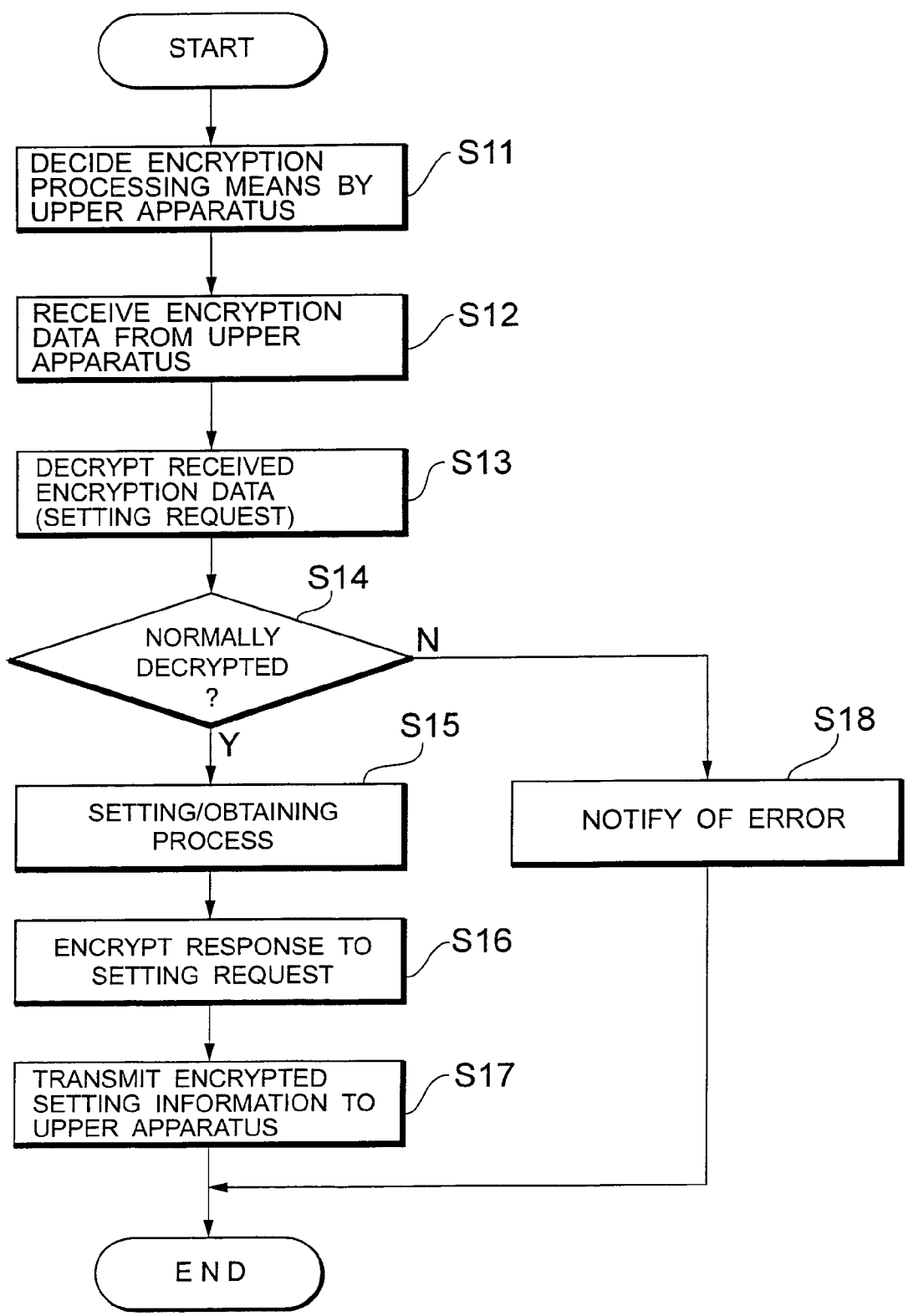
FIG. 6 is a flowchart showing a flow for general encryption setting communication.

FIG. 6 is a flowchart showing the flow for the general encryption setting communication. In FIG. 6, when the upper apparatus (PC 1) decides the encryption processing means (step S11), the printing apparatus 2 receives the decided encryption data from the PC 1 (step S12) and decrypts a setting request as received encryption data (step S13). The printing apparatus 2 discriminates whether or not the encryption data (that is, setting request) has normally been decrypted (step S14). If it was normally decrypted (YES in step S14), a process for obtaining the setting request is executed (step S15). Further, the printing apparatus 2 encrypts a response to the setting request (step S16) and transmits information of the encrypted setting request to the upper apparatus (PC 1) (step S17). If it is not normally decrypted in step S14 (NO in step S14), the printing apparatus 2 notifies the PC 1 of an error (step S18).

Figure 7:
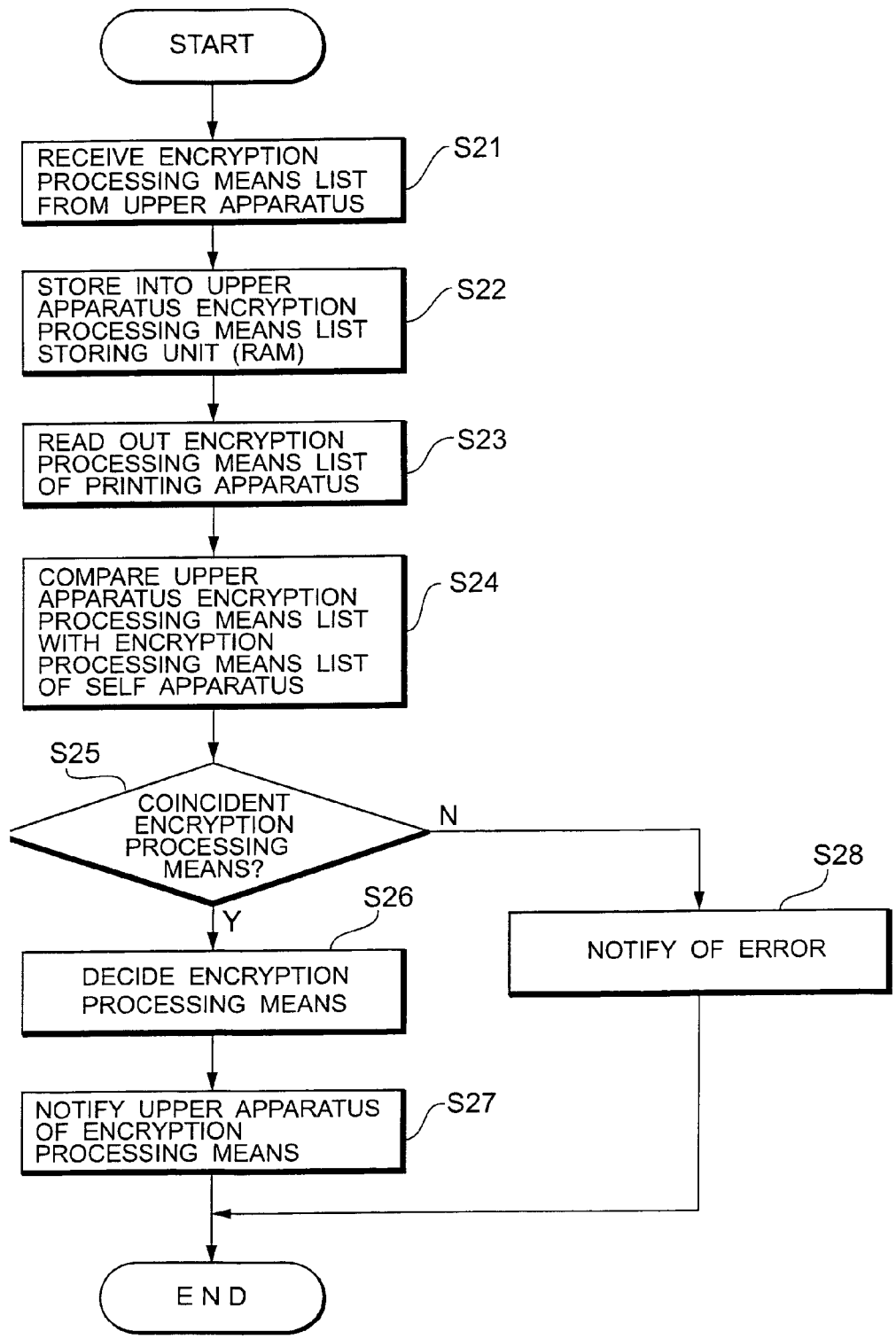
FIG. 7 is a flowchart showing a flow for a process for deciding the encryption processing means in the first embodiment of the invention.

A flow for the process for deciding the encryption processing means in step S1 in the encryption print communication in FIG. 5 and a flow for the process for deciding the encryption processing means in step S1 in the encryption setting communication in FIG. 6 will now be described. FIG. 7 is a flowchart showing the flow for the process for deciding the encryption processing means in the first embodiment of the invention. First, the transmission/reception control unit 24 of the printing apparatus 2 receives the list of the encryption processing means shown by the printer driver in the PC 1 as an upper apparatus through the network I/F unit 25 (step S21). The transmission/reception control unit 24 of the printing apparatus 2 temporarily stores the received list of the encryption processing means into the upper apparatus encryption processing means list storing unit 33 in the RAM 21 (step S22). Subsequently, the encryption processing means deciding unit 32 reads out the list of the encryption processing means which can be used in the printing apparatus 2 from the encryption processing means list storing unit 31 in the flash memory 23 (step S23) and compares the read-out upper apparatus encryption processing means list with the encryption processing means list of the printing apparatus 2 (step S24).

The encryption processing means deciding unit 32 discriminates the presence or absence of the encryption processing means which coincides with the list of the upper apparatus encryption processing means in a comparison result (step S25). If the coincident encryption processing means exists (YES in step S25), the encryption processing means deciding unit 32 decides the encryption processing means which is used in the encryption communication between the PC 1 and the printing apparatus 2 in accordance with information of such means (step S26) and transfers the decided encryption processing means to the transmission/reception control unit 24. Thus, the transmission/reception control unit 24 notifies the PC 1 as an upper apparatus of the decided encryption processing means through the network I/F unit 25 (step S27). If the coincident encryption processing means does not exist in step S25 (NO in step S25), the transmission/reception control unit 24 notifies the PC 1 of an error through the network I/F unit 25 (step S28). It is now assumed that the encryption processing means stored in the encryption processing means list storing unit 31 in the flash memory 23 of the printing apparatus 2 have been arranged in desired order (for example, ascending order) of the printing apparatus 2.

For example, in the case where the encryption processing means have been arranged in the ascending order, the encryption processing means deciding unit 32 sequentially compares and examines the encryption processing means stored in the encryption processing means list storing unit 31 in the flash memory 23 from the top. If the encryption processing means which coincides with the encryption processing means presented by the printer driver of the upper apparatus exists, it is used. When the encryption processing means deciding unit 32 compares the upper apparatus encryption processing means list with the encryption processing means list of the printing apparatus 2, the encryption kind, the system name, and the key size in the encryption processing means information in the upper apparatus encryption processing means list storing unit 33 are compared with the encryption kind 312, the system name 313, and the key size 314 in the encryption processing means deciding unit 32 as shown in FIG. 4, respectively, thereby confirming whether or not they coincide.

Figure 8A:
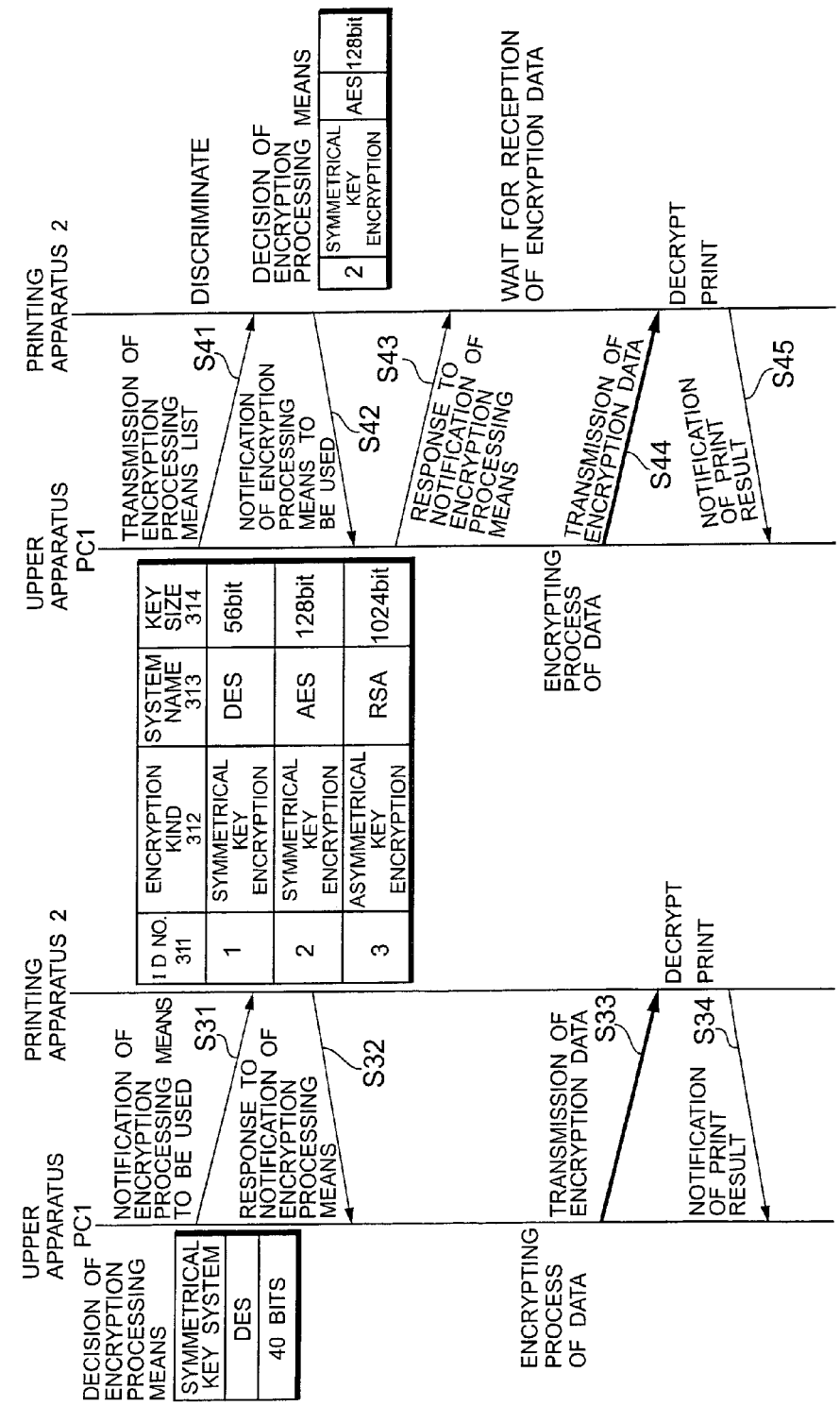

The print processing sequence which is executed between the PC 1 as an upper apparatus and the printing apparatus 2 will now be described. In this case, the explanation will be made while comparing the conventional print processing sequence with the print processing sequence in the first embodiment of the invention. FIGS. 8A and 8B are the print processing sequence which is executed between the PC 1 and the printing apparatus 2, in which FIG. 8A shows the prior art and FIG. 8B shows the first embodiment.

First, in the prior art of FIG. 8A, upon printing, the printer driver in the PC 1 encrypts the print data by the encryption processing means designated from the printing apparatus 2 and sends the encrypted print data to the printing apparatus 2. At this time, the designated encryption processing means is, for example, "encryption kind: symmetrical key encryption system, system name: DES, key size: 40 bits" (step S31). Subsequently, the printing apparatus 2 notifies the PC 1 of the response of the received encryption processing means (step S32). Thus, the PC 1 executes the encrypting process of the print data and transmits the encryption print data to the printing apparatus 2 (step S33). The printing apparatus 2 decrypts the received encryption print data, executes the printing, and notifies the PC 1 of the print result (step S34).

In the first embodiment of FIG. 8B, upon printing, the printer driver in the PC 1 as an upper apparatus transmits the list of the encryption processing means to the printing apparatus 2. The list of the encryption processing means at this time is, for example, "identification number: 1, encryption kind: symmetrical key encryption system, system name: DES, key size: 56 bits", "identification number: 2, encryption kind: symmetrical key encryption system, system name: AES, key size: 128 bits", and "identification number: 3, encryption kind: asymmetrical key encryption system, system name: RSA, key size: 1024 bits" (step S41). Thus, in the printing apparatus 2, "identification number: 2, encryption kind: symmetrical key encryption system, system name: AES, key size: 128 bits" is selected and the encryption processing means corresponding thereto is decided as encryption processing means which is used in the encryption processing means deciding unit 32. The transmission/reception control unit 24 notifies the PC 1 of the decided encryption processing means through the network I/F unit 25 (step S42). The transmission/reception control unit 24 of the printing apparatus 2 is notified of the response of the received encryption processing means by the PC 1 (step S43). At this time, the printing apparatus 2 waits for the reception of the encryption print data.

Subsequently, the PC 1 executes the encrypting process of the print data by the decided encryption processing means and transmits the encryption print data to the printing apparatus 2 (step S44). Thus, the transmission/reception control unit 24 of the printing apparatus 2 receives the encrypted print data through the network I/F unit 25. The encryption/decryption processing unit 34 decrypts the encryption print data received by the transmission/reception control unit 24. Further, the printing mechanism control unit 22 develops the decrypted print data into bit map data and executes the printing process. The transmission/reception control unit 24 notifies the PC 1 as an upper apparatus of the print result through the network I/F unit 25 (step S45).

The setting communicating sequence which is executed between the PC 1 as an upper apparatus and the printing apparatus 2 will now be described. In this case as well, the explanation will be made while comparing the conventional setting communicating sequence with the setting communicating sequence in the first embodiment of the invention for easy understanding. FIGS. 9A and 9B are the setting communicating sequence which is executed between the PC 1 and the printing apparatus 2, in which FIG. 9A shows the prior art and FIG. 9B shows the first embodiment.

First, in the prior art of FIG. 9A, at the time of the setting operation, the printer driver in the PC 1 encrypts the encryption processing means which is used in the printing apparatus 2 and transmits it to the printing apparatus 2. At this time, the encryption processing means which is used in the printing apparatus 2 is, for example, "encryption kind: symmetrical key encryption system, system name: DES, key size: 40 bits" (step S51). The printing apparatus 2 notifies the PC 1 of the response of the received encryption processing means (step S52). Thus, the PC 1 executes the encrypting process of the data and transmits the encryption data of the setting value request to the printing apparatus 2 (step S53). The printing apparatus 2 decrypts the encryption data of the received setting value request, executes the process of the setting value request, and transmits the requested setting value as encryption data to the PC 1 (step S54). Thus, the PC 1 displays the obtained setting value onto the setting display screen.

In the first embodiment of FIG. 9B, at the time of the setting operation, the setting communicating procedure is executed between browser software in the PC 1 as an upper apparatus and the printing apparatus 2. At this time, the browser software in the PC 1 transmits the list of the encryption processing means to the printing apparatus 2. The list of the encryption processing means at this time is, for example, "identification number: 1, encryption kind: symmetrical key encryption system, system name: DES, key size: 56 bits", "identification number: 2, encryption kind: symmetrical key encryption system, system name: AES, key size: 128 bits", and "identification number: 3, encryption kind: asymmetrical key encryption system, system name: RSA, key size: 1024 bits" (step S61). Thus, in the encryption processing means deciding unit 32 of the printing apparatus 2, "identification number: 2, encryption kind: symmetrical key encryption system, system name: AES, key size: 128 bits" is selected and the encryption processing means corresponding thereto is decided as encryption processing means which is used. The transmission/reception control unit 24 notifies the PC 1 of the decided encryption processing means through the network I/F unit 25 (step S62). The PC 1 notifies the printing apparatus 2 of the response of the received encryption processing means (step S63). At this time, the printing apparatus 2 waits for the reception of the encryption data.

Subsequently, the PC 1 executes the encrypting process of the print data and transmits the encryption data as setting value request information to the printing apparatus 2 (step S64). Thus, the transmission/reception control unit 24 of the printing apparatus 2 receives the encrypted setting value request information through the network I/F unit 25. The setting value request information is decrypted in the encryption/decryption processing unit 34. Further, the transmission/reception control unit 24 of the printing apparatus 2 forms a response to the PC 1 of the upper apparatus on the basis of the setting value request information in the apparatus setting information storing unit 26 in the flash memory 23 obtained or changed (set) on the basis of the decrypted setting value request information. The encryption/decryption processing unit 34 of the printing apparatus 2 encrypts the formed response (that is, setting value response) and, further, the transmission/reception control unit 24 transmits the encrypted setting value response to the PC 1 serving as an upper apparatus through the network I/F unit 25 (step S65). Thus, the PC 1 displays the obtained setting value onto the setting display screen.

As described above, according to the printing apparatus of the first embodiment of the invention, the printing apparatus 2 to which the setting information and print information have been presented from the PC 1 as an upper apparatus decides the encryption processing means which is used on the basis of the presented information and the information stored in the self apparatus. Therefore, even if the user does not make the detailed setting for printing on the PC, the optimum encryption processing means is automatically selected, the communication with the printing apparatus is made, and the printing apparatus is enabled to execute the desired printing.

Second Embodiment

In the case of the second embodiment as well, the prerequisite conditions in which the upper apparatus is the PC in which the printer driver adapted to the printing apparatus has been installed and the browser software which can be encryption-communicated has been installed in the printing apparatus are the same as those in the foregoing first embodiment. A construction of the printing apparatus is also fundamentally the same as that in the case of the first embodiment. It is assumed that, as for the list of the available encryption processing means in the encryption processing means list storing unit 31 in the flash memory 23 in the printing apparatus 2, the encryption processing means have been arranged in order from the lighter process.

<Operation>

The printing apparatus in the second embodiment will now be described with reference to FIG. 2. It is assumed that the encryption processing means stored in the encryption processing means list storing unit 31 in the flash memory 23 in the printing apparatus 2 have been arranged in order from the higher processing speed of the encrypting process (ascending order). FIG. 10 is a list table of the encryption processing means which is applied to the second embodiment. As shown in this list table, the processing speed in the symmetrical key encryption system is higher than that in the asymmetrical key encryption system and the processing speed in the system name (A) is higher than that in the system name (B).

That is, in the case where the printing apparatus 2 has the encryption processing means as shown on the list of the list table in FIG. 4 in the first embodiment as encryption processing means, in the second embodiment, the encryption processing means have been arranged in order as shown in FIG. 10 in the list table of the encryption processing means stored in the encryption processing means list storing unit 31. It is now assumed that nothing is considered with respect to the key size of the encryption processing means. In the case of the second embodiment, since the operation except that the encryption processing means stored in the encryption processing means list storing unit 31 in the flash memory 23 in the printing apparatus 2 have been arranged in order from the higher processing speed of the encrypting process (ascending order) is substantially the same as that in the first embodiment, its description is omitted here.

According to the printing apparatus in the second embodiment of the invention, when the printing apparatus 2 to which the information has been presented from the PC 1 decides the encryption processing means which is used on the basis of the presented information and the information stored in the self apparatus, the encryption processing means is preferentially selected in order from the higher processing speed, so that the encryption processing means can be preferentially selected in order from the lighter process (that is, from the higher processing speed). Thus, the response speed at the time of the printing process can be improved.

Third Embodiment

In the case of the third embodiment as well, the prerequisite conditions in which the upper apparatus is the PC in which the printer driver adapted to the printing apparatus has been installed and the browser software which can be encryption-communicated has been installed in the printing apparatus are the same as those in the foregoing first embodiment. A construction of the printing apparatus is also fundamentally the same as that in the case of the first embodiment. It is assumed that, as for the list of the available encryption processing means in the encryption processing means list storing unit 31 in the flash memory 23 in the printing apparatus 2, the encryption processing means have been arranged in ascending order from the higher encryption intensity (that is, in order from a higher degree of difficulty of decryption).

<Operation>

The printing apparatus in the third embodiment will now be described with reference to FIG. 2. FIG. 11 is a list table of the encryption processing means which is applied to the third embodiment of the invention. As shown in this list table, the encryption intensity in the asymmetrical key encryption system is higher than that in the symmetrical key encryption system and the encryption intensity in the system name (A) is higher than that in the system name (B). That is, in the case where the printing apparatus 2 has the encryption processing means shown on the list in FIG. 4 in the first embodiment as encryption processing means, in the third embodiment, the encryption processing means have been arranged in order as shown in FIG. 11 on the list of the encryption processing means stored in the encryption processing means list storing unit 31. It is now assumed that nothing is considered with respect to the key size of the encryption processing means. In the case of the third embodiment, since the operation except that the encryption processing means stored in the encryption processing means list storing unit 31 in the flash memory 23 in the printing apparatus 2 have been arranged in order from the higher encryption intensity (ascending order) is substantially the same as that in the first embodiment, its description is omitted here.

According to the printing apparatus in the third embodiment of the invention, when the printing apparatus 2 to which the information has been presented from the PC 1 decides the encryption processing means which is used on the basis of the presented information and the information stored in the self apparatus, the encryption processing means is preferentially selected in order from the higher encryption intensity, so that the encryption processing means can be efficiently selected in order from the lighter safety.

Fourth Embodiment

In the case of the fourth embodiment as well, the prerequisite conditions in which the upper apparatus is the PC in which the printer driver adapted to the printing apparatus has been installed and the browser software which can be encryption-communicated has been installed in the printing apparatus are the same as those in the foregoing first embodiment. In the fourth embodiment, explanation will be made as an example in the case where the printing apparatus receives the user identification information and the encryption processing means is determined by using the received user identification information as one of references.

<Operation>

Figure 12:
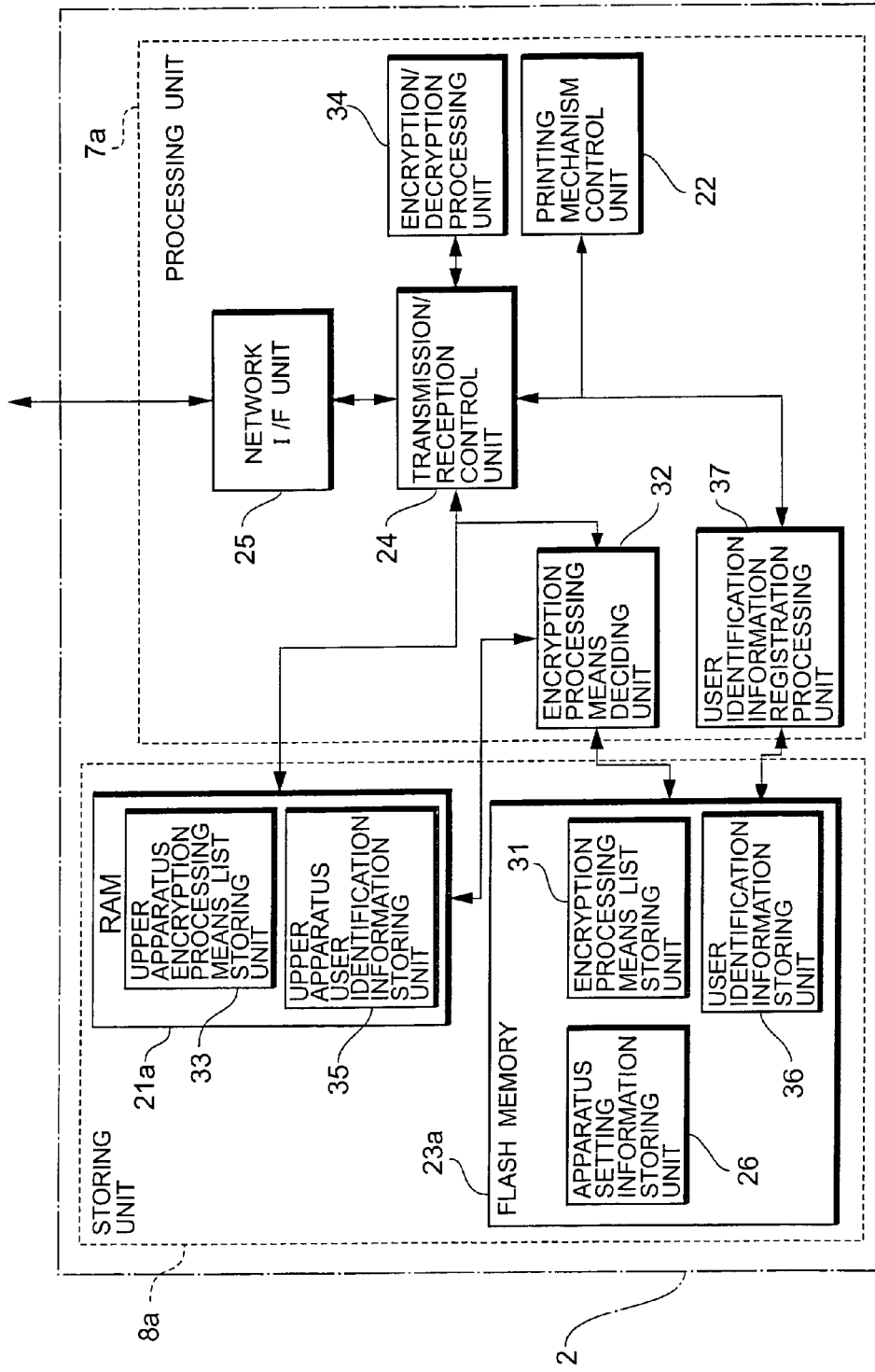
FIG. 12 is a constructional diagram of the printing apparatus which is applied to the fourth embodiment of the invention.

A construction of a network print system in the fourth embodiment is substantially the same as that of FIG. 1 and the PC 1 and the printing apparatus 2 are connected through a network such as Ethernet 3 or the like. FIG. 12 is a constructional diagram of the printing apparatus which is applied to the fourth embodiment of the invention. As shown in FIG. 12, the printing apparatus 2 in the fourth embodiment is obtained by adding the following component elements to the printing apparatus 2 which is applied to the first embodiment shown in FIG. 2: an upper apparatus user identification information storing unit (upper apparatus user identification information storing means in claim 8) 35 which temporarily stores the user identification information that is presented from the PC 1 as an upper apparatus; a user identification information storing unit 36 in which user identification information that is used to discriminate whether or not the user identification information shown by the PC 1 is correct has previously been stored; and a user identification information registration processing unit (identification information registration processing means in claim 7) 37 which registers the user identification information. The upper apparatus user identification information storing unit 35 is added to the RAM 21. The user identification information storing unit 36 is added to the flash memory 23. The user identification information registration processing unit 37 is added to the processing unit 7. Therefore, in FIG. 12, a RAM is shown by reference numeral 21*a*, a flash memory is shown by 23*a*, and a processing unit is shown by 7*a*. In this manner, "a" is added to each reference numeral of each component element shown in FIG. 2.

FIG. 13 is a diagram showing an example of the user identification information which is applied to the fourth embodiment. As shown in FIG. 13, the user identification information is constructed by, for example, an identification number (ID No.) 361, a user name 362, and a password 363. FIG. 14 is a diagram showing an example of a registration display screen of the user identification information which is applied to the fourth embodiment. That is, as shown in FIG. 14, an input display screen of the user identification information which is processed by the user identification information registration processing unit 37 in FIG. 12 has a registration information input field to input the registration information and a registration information list field in which the registration information which has already been registered in the printing apparatus 2 is displayed.

<Operation>

Figure 15:
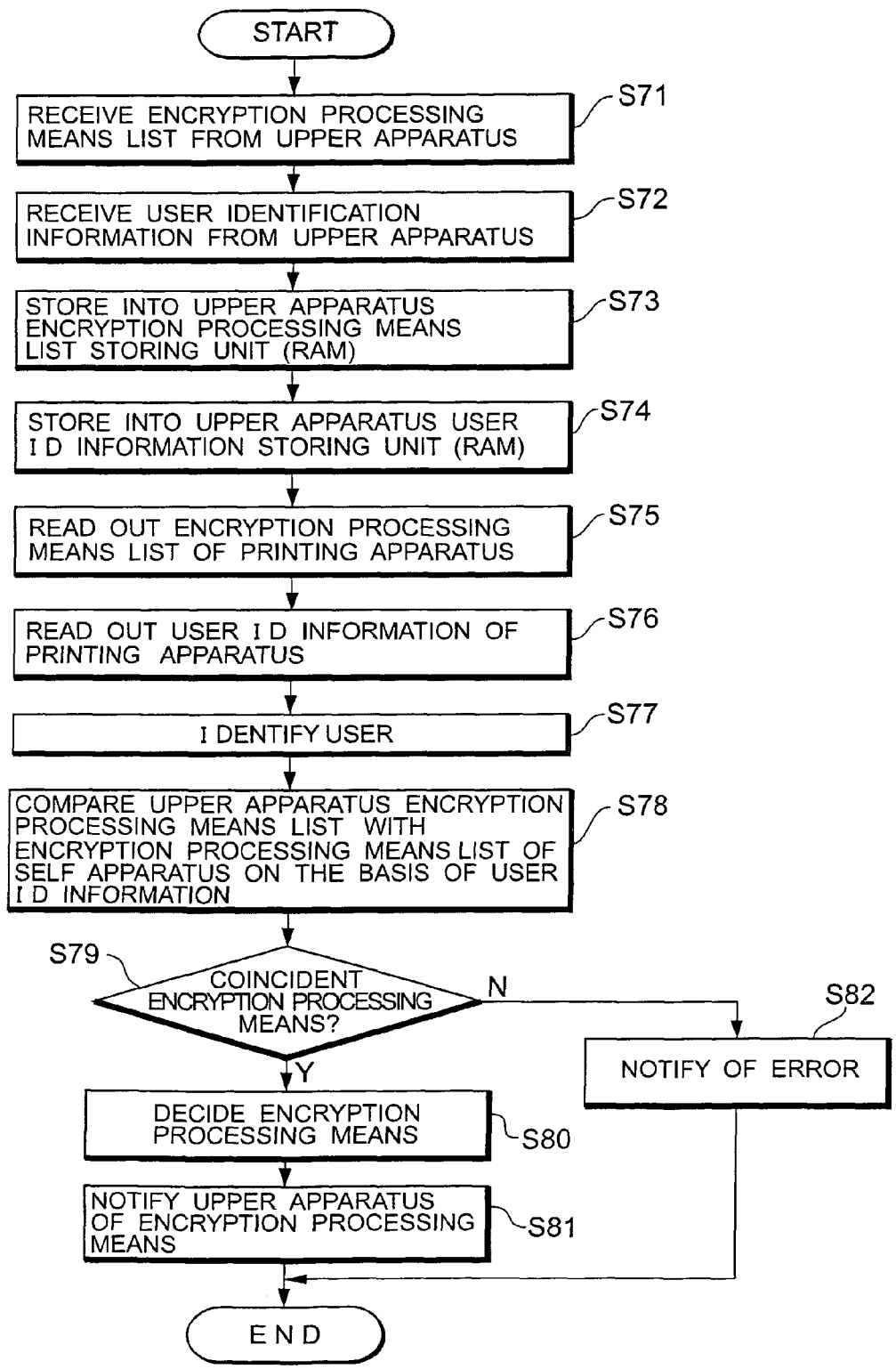
FIG. 15 is a flowchart showing a flow for a process for deciding the encryption processing means in the fourth embodiment of the invention.

In the case of the fourth embodiment as well, a flow for the general encryption print communication which is executed between the PC 1 and the printing apparatus 2 is fundamentally the same as that in FIG. 5 mentioned above and a flow for the general encryption setting communication is also fundamentally the same as that in FIG. 6. Therefore, in the fourth embodiment, a flow for the deciding process of the encryption processing means in step S1 in the encryption print communication in FIG. 5 and a flow for the deciding process of the encryption processing means in step S1 in the encryption setting communication in FIG. 6 as a feature of the invention will be explained. FIG. 15 is a flowchart showing the flow for the process for deciding the encryption processing means in the fourth embodiment of the invention.

In FIG. 15, first, the transmission/reception control unit 24 of the printing apparatus 2 receives the list of the encryption processing means shown by the browser software in the PC 1 as an upper apparatus through the network I/F unit 25 (step S71). The transmission/reception control unit 24 further receives the user identification information shown by the browser software in the PC 1 as an upper apparatus through the network I/F unit 25 (step S71). The transmission/reception control unit 24 temporarily stores the received list of the encryption processing means into the upper apparatus encryption processing means list storing unit 33 in the RAM 21 (step S73). The transmission/reception control unit 24 further stores the received user identification information into the upper apparatus user identification information storing unit 35 in the RAM 21 (step S74). Subsequently, the encryption processing means deciding unit 32 reads out the list of the encryption processing means which can be used in the printing apparatus 2 from the encryption processing means list storing unit 31 in the flash memory 23 (step S75) and reads out the user identification information from the user identification information storing unit 36 in the flash memory 23 (step S76).

The encryption processing means deciding unit 32 of the printing apparatus 2 identifies the user on the basis of the user identification information read out from the user identification information storing unit 36 in the flash memory 23 (step S77). Further, the encryption processing means deciding unit 32 compares the upper apparatus encryption processing means list with the list of the encryption processing means in the printing apparatus 2 on the basis of the user identification information (step S78). The encryption processing means deciding unit 32 discriminates the presence or absence of the encryption processing means which coincides with the list of the upper apparatus encryption processing means in a comparison result (step S79). If the coincident encryption processing means exists (YES in step S79), the encryption processing means deciding unit 32 decides the encryption processing means which is used in the encryption communication between the PC 1 and the printing apparatus 2 in accordance with information of such means (step S80) and transfers the decided encryption processing means to the transmission/reception control unit 24. Thus, the transmission/reception control unit 24 notifies the PC 1 as an upper apparatus of the decided encryption processing means through the network I/F unit 25 (step S81). If the coincident encryption processing means does not exist in step S79 (NO in step S79), the transmission/reception control unit 24 of the printing apparatus 2 notifies the PC 1 of an error (step S82).

Figure 16:
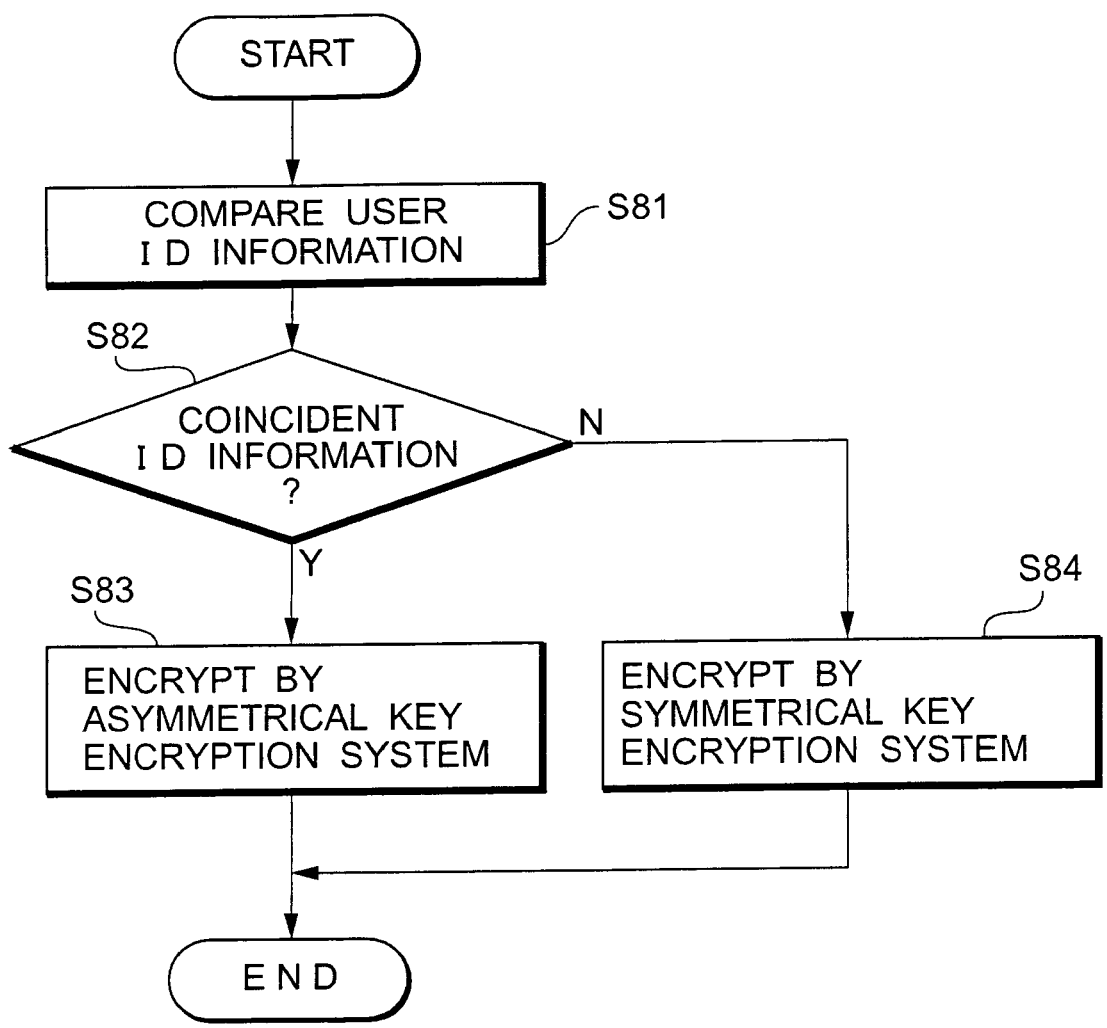
FIG. 16 is a flowchart showing a flow for a user identifying process in the fourth embodiment of the invention.

FIG. 16 is a flowchart showing the flow for the user identifying process in the fourth embodiment of the invention. In FIG. 16, the user identification information registration processing unit 37 of the printing apparatus 2 compares the user identification information presented from the upper apparatus with the user identification information stored in the user identification information storing unit 36 in the flash memory 23 (step S81) and discriminates the presence or absence of the coincident user identification information (step S82). If the coincident user identification information exists here (YES in step S82), the encryption processing means deciding unit 32 limits the encryption processing means which is used to the more powerful encryption processing means, for example, to the encryption processing means of the asymmetrical key encryption system. After that, the encryption processing means deciding unit 32 sequentially compares and examines the encryption processing means stored in the encryption processing means list storing unit 31 of the printing apparatus 2 from the top. If the encryption processing means which coincides with the encryption processing means presented by the printer driver exists, the encryption/decryption processing unit 34 makes encryption by using the coincident encryption processing means (step S83).

If the user identification information presented by the upper apparatus does not coincide with the contents in the user identification information storing unit 36 in the flash memory 23 in the printing apparatus 2 (NO in step S82), the encryption processing means deciding unit 32 limits the encryption processing means which is used to the encryption processing means of the lower encryption intensity, for example, to the encryption processing means of the symmetrical key encryption system. After that, the encryption processing means deciding unit 32 sequentially compares and examines the encryption processing means stored in the encryption processing means list storing unit 31 of the printing apparatus 2 from the top. If the encryption processing means which coincides with the encryption processing means presented by the printer driver exists, the encryption/decryption processing unit 34 makes encryption by using the coincident encryption processing means (step S84). When the user identification information registration processing unit 37 compares the user identification information, the encryption kind, the system name, and the key size in the encryption processing means information in the upper apparatus encryption processing means list storing unit 33 are compared with the encryption kind 312, the system name 313, and the key size 314 in the encryption processing means deciding unit 32, respectively, thereby confirming whether or not they coincide. In this manner, the encryption processing means deciding unit 32 limits the encryption processing means on the basis of the user identification information presented from the upper apparatus. It is assumed that the user identification information has previously been registered into the user identification information storing unit 36 in the flash memory 23 of the printing apparatus 2 by the user identification information registration processing unit 37.

Figure 17:
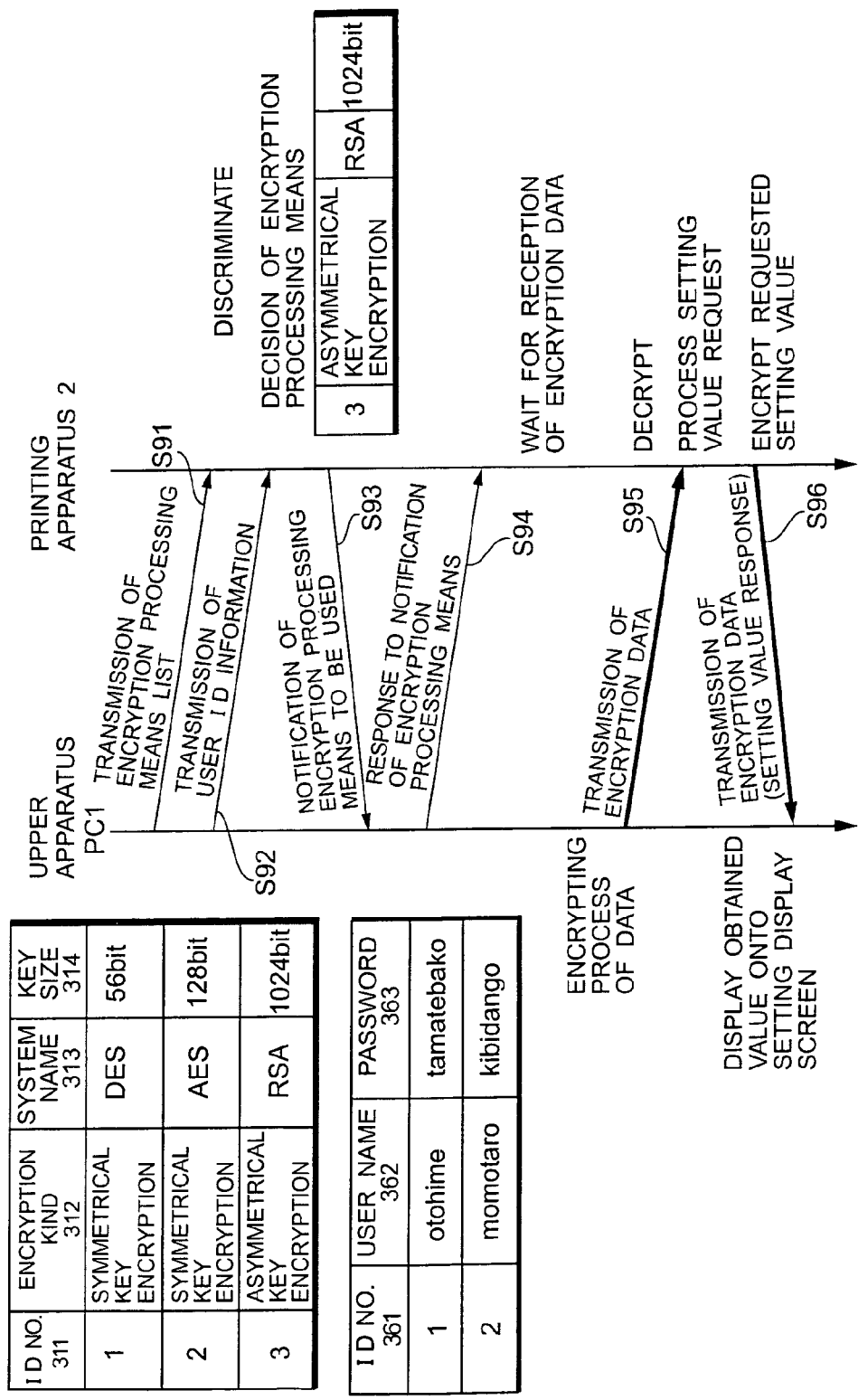
FIG. 17 is a setting communicating sequence which is executed between the PC 1 and the printing apparatus 2 in the fourth embodiment of the invention.

The setting communicating sequence which is executed between the PC 1 as an upper apparatus and the printing apparatus 2 will now be described. FIG. 17 shows the setting communicating sequence which is executed between the PC 1 and the printing apparatus 2 in the fourth embodiment of the invention. In FIG. 17, in the fourth embodiment, at the time of the setting operation, the setting communicating sequence is executed between the browser software in the PC 1 as an upper apparatus and the printing apparatus 2. At this time, the browser software in the PC 1 transmits the list of the encryption processing means to the printing apparatus 2. The list of the encryption processing means in this instance is, for example, "identification number: 1, encryption kind: symmetrical key encryption system, system name: DES, key size: 56 bits", "identification number: 2, encryption kind: symmetrical key encryption system, system name: AES, key size: 128 bits", and "identification number: 3, encryption kind: asymmetrical key encryption system, system name: RSA, key size: 1024 bits" (step S91).

The browser software in the PC 1 transmits the user identification information to the printing apparatus 2. At this time, the user identification information is, for example, "identification number: 1, user name: otohime, password: tamatebako" and "identification number: 2, user name: momotaro, password: kibidango" (step S92).

Thus, the encryption processing means deciding unit 32 of the printing apparatus 2 selects "identification number: 3, encryption kind: asymmetrical key encryption system, system name: RSA, key size: 1024 bits" and determines the encryption processing means corresponding thereto as encryption processing means which is used and notifies the PC 1 of the decided encryption processing means as encryption processing means which is used (step S93). Thus, the PC 1 notifies the transmission/reception control unit 24 of the response of the received encryption processing means through the network I/F unit 25 of the printing apparatus 2 (step S94). At this time, the printing apparatus 2 waits for the reception of the encryption data.

Subsequently, the PC 1 executes the encrypting process of the data and transmits the encryption data as setting value request information to the printing apparatus 2. That is, the browser software in the PC 1 encrypts the setting value request information by the encryption processing means designated from the printing apparatus 2 and transmits the encrypted information to the printing apparatus 2 (step S95). Thus, the transmission/reception control unit 24 of the printing apparatus 2 receives the encrypted setting value request information through the network I/F unit 25 and decrypts the setting value request information by the encryption/decryption processing unit 34. Further, the transmission/reception control unit 24 of the printing apparatus 2 forms a response to the PC 1 as an upper apparatus in accordance with the obtained or changed (set) setting value request information in the apparatus setting information storing unit 26 in the flash memory 23 on the basis of the decrypted setting value request information. The response (that is, setting value response) formed by the encryption/decryption processing unit 34 of the printing apparatus 2 is encrypted and, further, the transmission/reception control unit 24 transmits the setting value response to the PC 1 as an upper apparatus through the network I/F unit 25 (step S96). Thus, the PC 1 displays the obtained setting values onto the setting display screen.

In other words, in the processes of steps S95 and S96, the transmission/reception control unit 24 of the printing apparatus 2 receives the encrypted setting value request information through the network I/F unit 25 and decrypts the received encryption setting value request information by the encryption/decryption processing unit 34. The decrypted setting value request information is discriminated by the transmission/reception control unit 24. If a discrimination result indicates the obtaining request of the setting information, the transmission/reception control unit 24 reads out the corresponding value from the apparatus setting information storing unit 26 in the flash memory 23, transfers the read-out data to the encryption/decryption processing unit 34, encrypts it, and transmits the encrypted data to the upper apparatus through the network I/F unit 25. The decrypted setting value request information is discriminated by the transmission/reception control unit 24. If the discrimination result indicates the setting request, the transmission/reception control unit 24 sets the corresponding value into the apparatus setting information storing unit 26 in the flash memory 23. When the transmission/reception control unit 24 transfers the setting result to the encryption/decryption processing unit 34, the encryption/decryption processing unit 34 encrypts the setting result. Further, the encrypted setting result is transmitted to the PC 1 as an upper apparatus from the transmission/reception control unit 24 through the network I/F unit 25.

The browser software in the PC 1 as an upper apparatus which received the encrypted setting request result from the printing apparatus 2 decrypts the received data and displays it. It is assumed that the registration of the user identification information is made by using the browser software. When the user identification information is registered, the identification number, the user name, and the password are inputted on the display screen of the browser software in the PC 1. The registration data of the user identification information which was inputted is transmitted to the transmission/reception control unit 24 from the browser software in the PC 1 through the network I/F unit 25 and further transmitted from the transmission/reception control unit 24 to the user identification information registration processing unit 37. The user identification information registration processing unit 37 registers the registration data of the user identification information into the user identification information storing unit 36 in the flash memory 23 in the printing apparatus 2.

According to the printing apparatus of the fourth embodiment in the invention, by considering the user identification information shown by the PC 1, the printing apparatus 2 can decide the encryption processing means according to a desire of the user. For example, in the case of setting significant information in the printing apparatus 2 by using the browser software in the PC 1 as an upper apparatus (for example, administrator setting), it is identified that the user is the specified user (for example, administrator) and the more powerful encryption processing means can be selected without the setting by the user from the client apparatus (that is, PC 1). Thus, the printing apparatus decides the powerful encryption processing means with respect to the significant administrator setting information and decides the standard encryption processing means with respect to the general user. As mentioned above, the printing apparatus can select the encrypting process according to the significance of the information without being aware of it by the user.

<<Application of Use Mode>>

Although the foregoing first to fourth embodiments have been described on the assumption that the PC in which the printer driver has been installed is used as an upper apparatus, the upper apparatus is not limited to such a kind of PC but a PC having the encryption communicating function, another encryption communicating apparatus, software, or the like can be also used. Although the embodiments have been described on the assumption that in the case where the upper apparatus presents the encryption processing means list, the data is transmitted and received through the network, the method of presenting the encryption processing means list is not limited to such a method but it is also possible to use another method whereby it is stored into a portable storing medium such as FD, CD, or the like, this storing medium is carried and connected to the printing apparatus, and the information is directly transmitted and received to/from the printing apparatus. The information can be also transmitted and received by a method whereby it is downloaded via a data server or the like or by referring to the information in the data server.

Although the foregoing first to fourth embodiments have been described on the assumption that when the encryption processing means which is used by the printing apparatus 2 is decided, the list of the available encryption processing means is held in a list format in the encryption processing means list storing unit 31, the storing method is not limited to it but a preferable format suitable for reference can be also used. Although the data has been arranged in preferable order (for example, ascending order), the data can be also arranged in descending order and its order is not particularly limited.

Although the foregoing first to third embodiments have been described on the assumption that the printing apparatus 2 has the encryption processing means list storing unit 31 in the flash memory, the position of the encryption processing means list storing unit 31 which stores the available encryption processing means is not limited to the position in the flash memory. It can be provided on an external storing medium or in a built-in storing device such as ROM, hard disk, or the like of the PC main body in accordance with the use mode. Further, in the case of deciding the encryption processing means which is used by the printing apparatus 2, the list of the available encryption processing means is held in a list format in the encryption processing means list storing unit 31, they are arranged in desired order, the encryption processing means list shown by the upper apparatus (PC 1) is compared with the encryption processing means in the encryption processing means list storing unit 31 of the printing apparatus 2 in order from the upper means. If the coincident encryption processing means exists, this encryption processing means is used. However, the deciding method of the encryption processing means is not limited to such a method. For example, it is also possible to use a method whereby a rule to decide the encryption processing means is provided in the printing apparatus 2 and the encryption processing means is determined in accordance with this rule or a method of deciding by a rule instructed from the outside.

In the fourth embodiment, as a method of limiting the encryption system on the basis of the user identification information, when it is possible to confirm that the user identification information shown by the upper apparatus coincides with the contents in the user identification information storing unit 36 in the flash memory 23 of the printing apparatus 2, it is determined that the more powerful encryption processing means is necessary, and the encryption processing means which is used is limited to the encryption processing means of the asymmetrical key encryption system. However, the reference of the powerful encryption system is not always limited to the asymmetrical key encryption system but the symmetrical key encryption system can be also used and the selecting reference of the encryption processing means is arbitrarily specified. Although the fourth embodiment has been described on the assumption that the discriminating method using the encryption system (symmetrical key encryption system, asymmetrical key encryption system) as a reference is used to select the more powerful encryption processing means, it is also possible to limit an algorithm in the symmetrical key encryption system, limit an algorithm in the asymmetrical key encryption system, or combine both of them.

In the fourth embodiment, as a method of limiting the encryption system on the basis of the user identification information, when it is possible to confirm that the user identification information shown by the upper apparatus coincides with the contents in the user identification information storing unit 36 in the flash memory 23 of the printing apparatus 2, it is determined that the more powerful encryption processing means is necessary, and the encryption processing means which is used is limited to the encryption processing means of the asymmetrical key encryption system. However, it is also possible to determine that the weaker encryption processing means is necessary and the discriminating method is not particularly limited. Further, although the embodiment has been described on the assumption that the registration system by the browser software of the PC 1 is used when the user identification information is registered, the registering means of the user identification information is not limited to it. For example, the user identification information can be also registered by using means such as "telnet" as a protocol for accessing a specific computer system from a remote place, "FTP (File Transfer Protocol)" as a protocol for transferring a file, "SNMP (Simple Network Management Protocol)" as a protocol for monitoring and controlling communicating apparatuses connected to a network, or the like. The user identification information can be also registered from an operation panel unit of the printing apparatus 2 or by using dedicated software.

The present invention is not limited to the foregoing embodiments but many modifications and variations are possible within the spirit and scope of the appended claims of the invention.

What is claimed is:

1. A printing apparatus comprising:
    a transmitting and receiving section which transmits information to an external apparatus and receives information from an external apparatus;
    a first storing section which stores a first list of entries in a flash memory in which the first list of entries is retained upon a power source being turned on/off, each entry including processing information including an identification number corresponding to one of a plurality of first encryption processing means that can be used by the printing apparatus, the entries of the first list capable of being arranged in a predetermined order by a user;
    a second storing section which stores a second list of entries in a random access memory in which the second list of entries is erased upon the power source being turned on/off, each entry including processing information corresponding to one of a plurality of second encryption processing means that can be used by the external apparatus, the second list being previously received by the printing apparatus from the external apparatus; and
    a deciding section which sequentially compares, in the predetermined order of the first list, the entries of the first list with the entries of the second list;
    wherein if one of the entries of the first list matches one of the entries of the second list, the deciding section selects the processing means corresponding to a first matching entry for use by both the printing apparatus and the external apparatus and notifies the external apparatus of the selected encryption processing means and if a matched entry does not exist, the deciding section notifies the external apparatus of an error.

2. The printing apparatus according to claim 1, wherein the entries in the first list are arranged in an order of decreasing processing speed starting from the higher processing speed.

3. The printing apparatus according to claim 2, wherein
    the plurality of encryption processing means includes a symmetrical key encryption processing means and an asymmetrical key encryption processing means, and wherein
    the first and the second encryption processing information are made up of:
    an encryption identification symbol which corresponds to the symmetrical key encryption processing means and an encryption identification symbol which corresponds to the asymmetrical key encryption processing means; and wherein
    the speed precedence selection portion refers to the encryption identification symbols to select said symmetrical key encryption processing means as encryption processing means which is preferentially used.

4. The printing apparatus according to claim 1, wherein the list of entries of the first list are arranged in an order of degree of difficulty of decryption starting with the higher degree of difficulty.

5. The printing apparatus according to claim 4, wherein
    the encryption processing means are made up of symmetrical key encryption processing means and an asymmetrical key encryption processing means;

the information are made up of a encryption identification symbol which corresponds to the symmetrical key encryption processing means and a encryption identification symbol which corresponds to the asymmetrical key encryption processing means; and the strength precedence selection portion refers to the encryption identification symbols to select said asymmetrical key encryption processing section as an encryption processing means which is preferentially used.

6. A system for communicating encrypted data through a communications path, the system comprising:

an external apparatus comprising:
an encryption processing information storing section which stores first encryption processing information, the first encryption processing information identifying at least one first encryption processing means that can be used by the external apparatus;
at least one encryption processing means; and
a print driver that receives and transmits the first encryption processing information; and a printing apparatus comprising:
a transmitting and receiving section which transmits information to an external apparatus and receives information from an external apparatus;
a first storing section which stores a first list of entries in a flash memory in which the first list of entries is retained upon a power source being turned on/off, each entry including processing information including an identification number corresponding to each one of a plurality of first encryption processing means that can be used by the printing apparatus, the entries of the first list being arranged in a predetermined order;
a second storing section which stores a second list of entries in a random access memory in which the second list of entries is erased upon the power source being turned on/off, each entry including processing information corresponding to one of a plurality of second encryption processing means that can be used by the external apparatus, the second list being previously received by the printing apparatus from the external apparatus; and
a deciding section which sequentially compares, in the predetermined order of the first list, the entries of the first list with the entries of the second list;
wherein if one of the entries of the first list matches one of the entries of the second list, the deciding section selects the processing means corresponding to a first matching entry for use by both the printing apparatus and the external apparatus and notifies the external apparatus of the selected encryption processing means and if a matched entry does not exist, the deciding section notifies the external apparatus of an error.

7. The printing system according to claim 6, wherein the entries in the first list are arranged in an order of decreasing processing speed starting from the higher processing speed.

8. The printing apparatus according to claim 6, wherein
the plurality of encryption processing means include a symmetrical key encryption processing means and an asymmetrical key encryption processing means;
the encryption processing information are made up of a encryption identification symbol which corresponds to the symmetrical key encryption processing means and an encryption identification symbol which corresponds to the asymmetrical key encryption processing means; and
the speed precedence selection portion refers to the encryption identification symbols to select said symmetrical key encryption processing means as encryption processing means which is preferentially used.

9. The printing apparatus according to claim 6, wherein the list of entries of the first list are arranged in an order of degree of difficulty of decryption starting with the higher degree of difficulty.

10. The printing apparatus according to claim 9, wherein
the plurality of encryption processing means are made up of symmetrical key encryption processing means and an asymmetrical key encryption processing means;
the information are made up of a encryption identification symbol which corresponds to the symmetrical key encryption processing means and a encryption identification symbol which corresponds to the asymmetrical key encryption processing means; and
the strength precedence selection portion refers to the encryption identification symbols to select said asymmetrical key encryption processing section as an encryption processing means which is preferentially used.

11. The apparatus of claim 1, wherein if the matching second encryption processing means does not exist, the deciding section notifies the external apparatus of an error.

12. The apparatus of claim 1, wherein the first storing section is comprises a flash memory in which information is not erased even if a power source is turned on/off.

13. The apparatus of claim 1, wherein the second storing section is comprises a random access memory in which information is erased when a power source is turned on/off.

14. The apparatus of claim 6, wherein if the matching second encryption processing means does not exist, the deciding section notifies the external apparatus of an error.

15. The apparatus of claim 6, wherein the first storing section is comprises a flash memory in which information is not erased even if a power source is turned on/off.

16. The apparatus of claim 6, wherein the second storing section is comprises a random access memory in which information is erased when a power source is turned on/off.

17. A printing apparatus which has a plurality of first encryption processing sections and executes a desired printing process, said apparatus comprising:
an encryption information storing section in a flash memory which stores information corresponding to each of the plurality of first encryption processing sections in said printing apparatus, said information being stored in a predetermined order; and
an identification information storing section in said flash memory which stores user identification information, said flash memory retaining said information corresponding to each of the plurality of first encryption processing sections and said user identification information upon the source of power being turned on/off;
a random access memory which stores user identification information and information corresponding to a plurality of second encryption processing sections received from an external apparatus, said random access memory being erased upon a source of power being turned on/off;
a deciding section which compares the user identification information received from said external apparatus with the user identification information stored in said identification information storing section, compares the information corresponding to the plurality of second encryption processing sections received from said external apparatus with the information corresponding to said plurality of first encryption processing sections stored in said printing apparatus encryption information storing section, and selectively decides based on the comparison of the user with the user identification information and of the comparison the information corresponding to the first and second encryption processing sections, which one of the plurality of the encryption processing sections is to be used with the encryption data in said printing apparatus.

18. The printing apparatus according to claim 17, wherein the deciding section has an encryption limiting portion which allows an encryption strength to used by a user having user identification information stored in the identification information storing section to be higher than that used by user not having identification information stored in the identification information storing section.

19. The printing apparatus according to claim 17, further comprising:
a sending section which sends information corresponding to the encryption processing section selectively decided by the deciding section to the upper external apparatus.

20. The printing apparatus according to claim 17, further comprising:
an error notifying section which performs an error notification to the apparatus when there is not a corresponding encryption processing section.

* * * * *